United States Patent
Mallipudi et al.

(10) Patent No.: US 11,528,190 B2
(45) Date of Patent: Dec. 13, 2022

(54) CONFIGURATION DATA MIGRATION FOR DISTRIBUTED MICRO SERVICE-BASED NETWORK APPLICATIONS

(71) Applicant: Juniper Networks, Inc., Sunnyvale, CA (US)

(72) Inventors: Sri Sampath Mallipudi, Bengaluru (IN); Shivaprasad Gali, Bangalore (IN); Chandrasekhar A, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/247,947

(22) Filed: Dec. 31, 2020

(65) Prior Publication Data
US 2022/0103427 A1      Mar. 31, 2022

(30) Foreign Application Priority Data
Sep. 29, 2020   (IN) .............................. 202041042209

(51) Int. Cl.
*H04L 12/24* (2006.01)
*H04L 41/0853* (2022.01)
(Continued)

(52) U.S. Cl.
CPC ............ *H04L 41/0853* (2013.01); *G06F 8/65* (2013.01); *H04L 12/44* (2013.01); *H04L 41/082* (2013.01);
(Continued)

(58) Field of Classification Search
CPC ..... H04L 41/0853; H04L 41/12; H04L 67/16; H04L 67/10; H04L 12/44; H04L 41/082; G06F 8/65
See application file for complete search history.

(56) References Cited

U.S. PATENT DOCUMENTS 8,693,374 B1    4/2014   Murphy et al.
8,700,801 B2    4/2014   Medved et al.
(Continued)

OTHER PUBLICATIONS

Bjorklund, "YANG—A Data Modeling Language for the Network Configuration Protocol (NETCONF)," Internet Engineering Task Force (IETF), RFC 6020, Oct. 2010, 173 pp.
(Continued)

*Primary Examiner* — Kim T Nguyen
(74) *Attorney, Agent, or Firm* — Shumaker & Sieffert, P.A.

(57) ABSTRACT

Techniques are described for in-service configuration data migration for distributed micro service-based applications. In one example, a network device comprises a plurality of legacy data repositories comprising configuration data in key-value pair format that specifies a plurality of parameters and corresponding values for operation of the network device, and a hierarchical configuration data model having a plurality of nodes arranged in a hierarchical organization having a root node and a plurality of leaf nodes. Each of the nodes of the configuration data model is configured to store a set of configuration data parameters for the network device. One or more of the nodes includes a plurality of external references to respective parameters of the plurality of parameters stored within the plurality of legacy data repositories. Process circuitry is configured to perform a migration of the configuration data from the legacy data repositories to the hierarchical data model.

12 Claims, 6 Drawing Sheets

(51) Int. Cl.
  *H04L 12/44* (2006.01)
  *H04L 41/082* (2022.01)
  *G06F 8/65* (2018.01)
  *H04L 67/10* (2022.01)
  *H04L 41/12* (2022.01)
  *H04L 67/51* (2022.01)

(52) U.S. Cl.
  CPC .............. *H04L 41/12* (2013.01); *H04L 67/10* (2013.01); *H04L 67/51* (2022.05)

(56) References Cited

U.S. PATENT DOCUMENTS

| | | | |
|---|---|---|---|
| 8,885,463 | B1 | 11/2014 | Medved et al. |
| 9,450,817 | B1 | 9/2016 | Bahadur et al. |
| 2003/0028521 | A1* | 2/2003 | Teloh .................. H04L 41/0803 |
| 2015/0199535 | A1* | 7/2015 | Wilson ................... H04L 63/20 |
| | | | 707/783 |
| 2017/0078158 | A1* | 3/2017 | Dec ......................... G06F 11/30 |
| 2018/0103084 | A1* | 4/2018 | Auvenshine ........ G06F 16/2246 |
| 2021/0028980 | A1* | 1/2021 | R ......................... H04L 41/0843 |

OTHER PUBLICATIONS

Enns et al. "Network Configuration Protocol (NETCONF)," RFC 6241, Internet Engineering Task Force, IETF, Jun. 2011, 113 pp.

Vasseur et al., "Path Computation Element (PCE) Communication Protocol (PCEP)," RFC 5440, Network Working Group, Mar. 2009, 76 pp.

Atlas et al. "Interface to the Routing System Framework, draft-ward-irs-framework-00," Internet-Draft, Network Working Group, Jul. 30, 2012, 21 pp.

* cited by examiner

CONFIGURATION DATA MIGRATION FOR DISTRIBUTED MICRO SERVICE-BASED NETWORK APPLICATIONS

This application claims the benefit of IN provisional application no. 202041042209 filed Sep. 29, 2020, the entire content of which is herein incorporated reference.

TECHNICAL FIELD

The invention relates to computer networks and, more specifically, to managing configuration data for network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Some network devices, such as network controllers, operate one or more distributed network applications in which components of the application execute as micro-services on a cluster of host servers. A wide area network (WAN) controller, for example, manages large-scale customer applications geographically distributed over large areas. Service provider networks typically provide an extensive network infrastructure to provide packet-based data services to the offered services. The network infrastructure typically includes a vast collection of access nodes, aggregation nodes and high-speed edge routers interconnected by communication links. These access devices typically execute various protocols and exchange signaling messages to anchor and manage subscriber sessions and communication flows associated with the subscribers. Managing configuration data for distributed network applications, such as a large-scale, micro-service-based WAN controller executing on a plurality of different host servers or virtualized network elements, may be particularly challenging.

SUMMARY

In general, techniques are described that provide automated, in-service migration of flat file-based configuration data sets (e.g., files or data tables) to centralized, hierarchical configuration data models for network devices operating according to, for example, a distributed micro-service architecture. The techniques may be particularly advantageous for a network device (e.g., WAN controllers, SDN controllers, multi-cloud systems, security systems, policy engines, or orchestrators) that utilize distributed software architectures in which the components of a network application execute on virtualized elements across a set of physical devices, each distributed component operating according to a respective, locally-stored flat file-based configuration data set.

The techniques may provide technical advantages of enabling in-service upgrade of the software application of a network device to distributed microservice based architecture, including automated, seamless migration of configuration data from a series of flat file-based data repositories spread across physical or virtual servers to one or more centralized configuration data models controlled by a configuration management service.

In one example, this disclosure describes a method for migrating configuration data for a network device. The method includes storing, on one or more computer-readable media of the network device, a plurality of legacy data repositories comprising configuration data for the network device in key-value pair format that specifies a plurality of parameters and corresponding values for operation of the network device, and storing a hierarchical configuration data model for the network device. The configuration data model includes a plurality of nodes arranged in a hierarchical organization having a root node and a plurality of leaf nodes, and each of the nodes of the configuration data model is configured to store a set of configuration data parameters for the network device. At least a subset of the nodes store, collectively, a plurality of external references to a respective parameter of the plurality of parameters stored within the plurality of legacy data repositories. The method further includes performing a migration of the configuration data for the network device by, for each of the external references defined within the nodes of the configuration data model, retrieving, with a software upgrade service executed by a processor, a respective parameter stored within the legacy data repositories and updating the respective node within the configuration data model to store the respective parameter.

In another example, this disclosure describes a method for migrating configuration data for a network device that includes storing, on one or more computer-readable media of the network device, a plurality of legacy data repositories comprising configuration data for the network device in key-value pair format that specifies a plurality of parameters and corresponding values for operation of the network device; storing a plurality of hierarchical configuration data models for the network device, wherein each of the configuration data models include a plurality of nodes arranged in a hierarchical organization having a root node and a plurality of leaf nodes, wherein each of the nodes is configured to store a set of configuration data parameters for the network device, and wherein one or more of the nodes includes a plurality of external references to respective parameters of the plurality of parameters stored within the plurality of legacy data repositories; storing, with at least one of the nodes that includes one of the external references, meta data specifying at least one data transformation operation to be performed on the respective parameter stored external to the configuration data model when migrating the configuration data model to include the parameter; generating, from the plurality of hierarchical configuration data models, a schema file that aggregates the nodes within the plurality of configuration data models into a hierarchical organization and includes within the aggregate nodes the plurality of external references to the parameters of the plurality of legacy data repositories; generating a first data migration map that specifies each of the key-value pairs of parameters and corresponding values of the plurality of legacy data repositories; generating a second data migration map from the schema file, wherein the second configuration map specifies (i) each of the external references within the configuration data model to the parameters stored within the plurality of legacy data repositories, and (ii) for each external reference, a path to the respective node within the plurality of configuration data models that contained the external reference; and traversing the first data migration map and, for each key-value pair of parameters and values of first data migration map, (i) performing any data transformation operation specified by the metadata for the parameter, and (ii) writing the parameter to the plurality of configuration data models according to the path specified by the second data migration map for the parameter.

In another example, this disclosure describes a network device that includes one or more computer-readable media storing data that includes (i) a plurality of legacy data repositories comprising configuration data for the network device in key-value pair format that specifies a plurality of parameters and corresponding values for operation of the network device, and (ii) a hierarchical configuration data model, wherein the configuration data model includes a plurality of nodes arranged in a hierarchical organization having a root node and a plurality of leaf nodes, wherein each of the nodes of the configuration data model is configured to store a set of configuration data parameters for the network device, and wherein one or more of the nodes includes a plurality of external references to respective parameters of the plurality of parameters stored within the plurality of legacy data repositories. The device further includes process circuitry configured to perform a migration of the configuration data for the network device by, for each of the external references defined within the nodes of the configuration data model, retrieving, with a software upgrade service executed by a processor, a respective parameter stored within the legacy data repositories and updating the respective node within the configuration data model to store the respective parameter.

In another example, this disclosure describes a network device for migrating configuration data for a network device. The network device that includes a memory, and process circuitry configured to: store, on one or more computer-readable media of the network device, a plurality of legacy data repositories comprising configuration data for the network device in key-value pair format that specifies a plurality of parameters and corresponding values for operation of the network device; store a plurality of hierarchical configuration data models for the network device, wherein each of the configuration data models include a plurality of nodes arranged in a hierarchical organization having a root node and a plurality of leaf nodes, wherein each of the nodes is configured to store a set of configuration data parameters for the network device, and wherein one or more of the nodes includes a plurality of external references to respective parameters of the plurality of parameters stored within the plurality of legacy data repositories; store, with at least one of the nodes that includes one of the external references, meta data specifying at least one data transformation operation to be performed on the respective parameter stored external to the configuration data model when migrating the configuration data model to include the parameter; generate, from the plurality of hierarchical configuration data models, a schema file that aggregates the nodes within the plurality of configuration data models into a hierarchical organization and includes within the aggregate nodes the plurality of external references to the parameters of the plurality of legacy data repositories; generate a first data migration map that specifies each of the key-value pairs of parameters and corresponding values of the plurality of legacy data repositories; generate a second data migration map from the schema file, wherein the second configuration map specifies (i) each of the external references within the configuration data model to the parameters stored within the plurality of legacy data repositories, and (ii) for each external reference, a path to the respective node within the plurality of configuration data models that contained the external reference; and traverse the first data migration map and, for each key-value pair of parameters and values of first data migration map, (i) performing any data transformation operation specified by the metadata for the parameter, and (ii) writing the parameter to the plurality of configuration data models according to the path specified by the second data migration map for the parameter.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
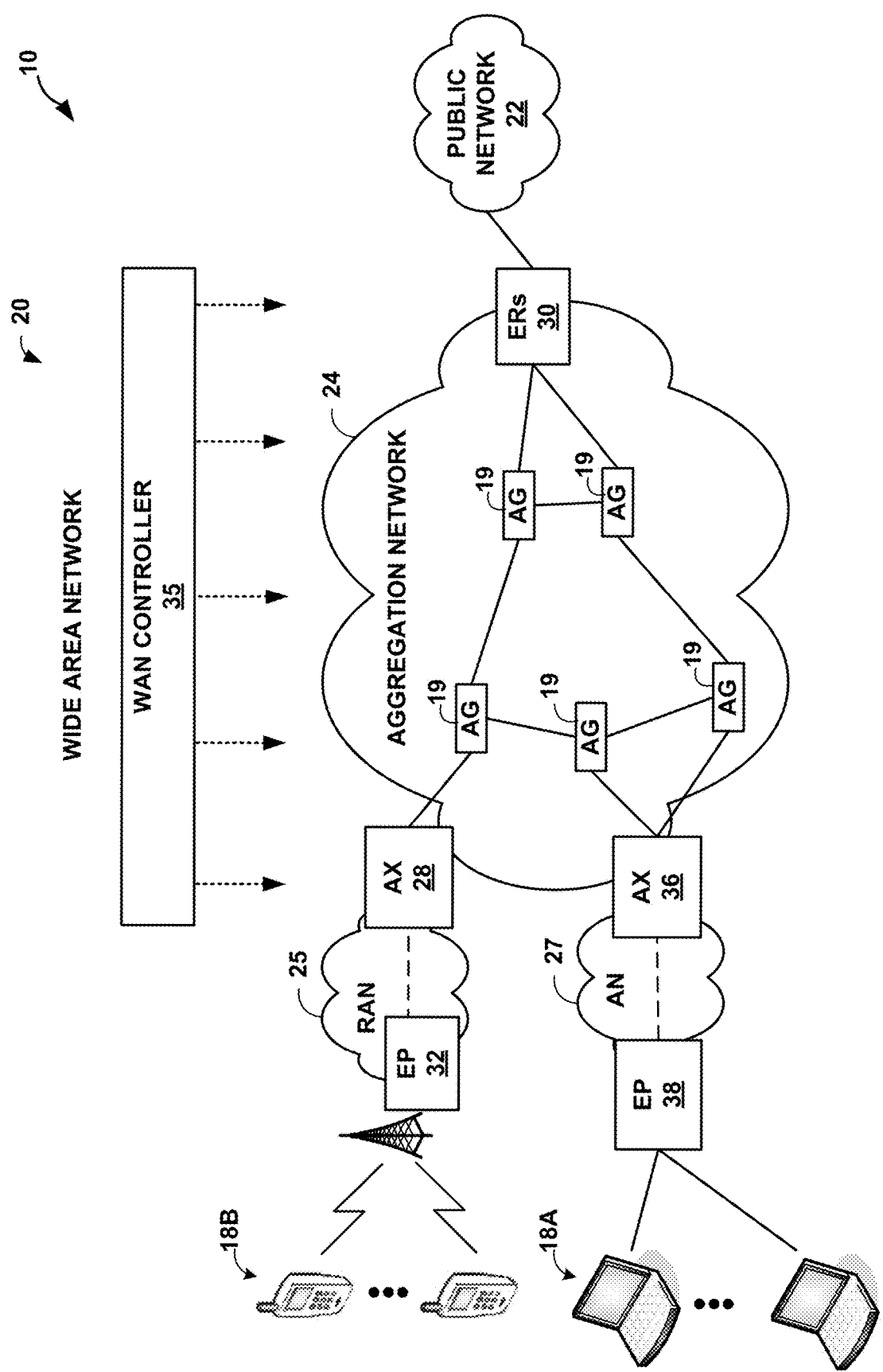
FIG. 1 is a block diagram illustrating an example network system in which a software upgrade service performs a data migration for configuration data of a WAN controller in accordance with techniques described herein.

FIG. 1 is a block diagram illustrating an example network system 10 in which a software upgrade service performs a data migration for an SD WAN network application provided by WAN controller 35 in accordance with techniques described herein. Although explained in reference to WAN controller 35, the techniques may be applied to provide seamless, automated migration of configuration data from a flat file architecture to a centralized configuration data model for other network devices.

In the example of FIG. 1, network system 10 includes a service provider network 20 coupled to a public network 22.

Service provider network 20 operates as a private network that provides packet-based network services to subscriber devices 18A, 18B (herein, "subscriber devices 18"). Subscriber devices 18A may be, for example, personal computers, laptop computers or other types of computing device associated with subscribers. Subscriber devices 18 may comprise, for example, mobile telephones, laptop or desktop computers having, e.g., a 3G wireless card, wireless-capable netbooks, video game devices, pagers, smart phones, personal data assistants (PDAs) or the like. Each of subscriber devices 18 may run a variety of software applications, such as word processing and other office support software, web browsing software, software to support voice calls, video games, videoconferencing, and email, among others.

Aggregation network 24 provides transport services for network traffic associated with subscribers 18. Aggregation network 24 typically includes one or more aggregation nodes ("AG") 19, such as internal routers and switches that provide transport services between access nodes (AXs) 28, 36 and edge routers (ERs) 30. Aggregation nodes 19 are nodes which aggregate several access nodes 28, 36. After authentication and establishment of network access through access network 27 or radio access network 25, any one of subscriber devices 18 may begin exchanging data packets with public network 22 with such packets traversing AXs 28, 36 and AGs 19. Although not shown, aggregation network may include other devices to provide security services, load balancing, billing, deep-packet inspection (DPI), and other services for mobile traffic traversing aggregation network 24.

As shown in FIG. 1, service provider network 20 includes a centralized controller 35 that operates as a software defined networking (SD WAN) controller that orchestrates various end-to-end solutions across various network devices of FIG. 1. As described herein, controller 25 operates to provide a central configuration point for configuring AGs 19 of aggregation network 24 provide transport services to transport traffic between AXs 28, 36 and edge routers 30. AGs 19 may, for example, operate as label switched routers (LSRs) that forward traffic along transport label switched paths (LSPs) defined within aggregation network 24. Access nodes 28, 36 and edge routers 30 may operate as endpoints for the LSPs to map subscriber traffic into and out of the LSPs. For example, edge routers 30 may map network services to individual LSPs within aggregation network 24, while access nodes 28, 36 map the network services to individual end points (EPs) 32, 38 via the LSPs. Controller 35 traffic engineers the LSPs through aggregation network 24 according to the bandwidth, Quality of Service (QoS) and availability requirements of network services applications, as further described below.

As further described below, WAN controller 35 includes a path computation module (PCM) that handles topology computation and path provisioning for the whole of aggregation network 24. That is, the PCM of controller 35 processes topology information for aggregation network 24, performs path computation and selection in real-time based on a variety of factors, including current load conditions of subscriber traffic, and provisions the LSPs within the aggregation network.

AXs 28, 36 and ERs 30 operate at the borders of aggregation network 24 and, responsive to controller 35, apply network services, such as authorization, policy provisioning and network connectivity, to network traffic associated with subscribers 18 in communication with access nodes 28, 36. In the example of FIG. 1, for ease of explanation, service provider network 20 is shown having two access nodes 28, 36, although the service provider network may typically service thousands or tens of thousands of access nodes.

In this example, service provider network includes an access network 27 with an AX 36 and EP 38 that provide subscriber devices 18A with access to aggregation network 24. In some examples, AX 36 may comprise a router that maintains routing information between subscriber devices 18A and aggregation network 24. AX 36, for example, typically includes Broadband Remote Access Server (BRAS) functionality to aggregate output from one or more EPs 38 into a higher-speed uplink to aggregation network 24. Edge router 30 provides an anchor point of active sessions for subscriber devices 18A. In this sense, edge router 30 may maintain session data and operate as a termination point for communication sessions established with subscriber devices 18A that are currently accessing packet-based services of public network 22 via aggregation network 24.

EP 38 may communicate with AX 36 over a physical interface supporting various protocols. EP 38 may comprise a switch, a router, a gateway, or another terminal that operates as a demarcation point between customer equipment, such as subscriber devices 18B, and service provider equipment. In one example, EP 38 may comprise a digital subscriber line access multiplexer (DSLAM) or other switching device. Each of subscriber devices 18A may utilize a Point-to-Point Protocol (PPP), such as PPP over Asynchronous Transfer Mode (ATM) or PPP over Ethernet (PPPoE), to communicate with EP 38. For example, using PPP, one of subscriber devices 18 may request access to aggregation network 24 and provide login information, such as a username and password, for authentication by policy server (not shown). Other embodiments may use other lines besides DSL lines, such as cable, Ethernet over a T1, T3 or other access links.

As shown in FIG. 1, service provider network 20 may include a radio access network 25 with an access node (AX) 28 and EP 32 that provide subscriber devices 18B with access to aggregation network 24 via radio signals. For example, EP 32 may be connected to one or more wireless radios or base stations (not shown) to wirelessly exchange packetized data with subscriber devices 18B. EP 32 may comprise a switch, a router, a gateway, or another terminal that aggregates the packetized data received from the wireless radios to AX 28. The packetized data may then be communicated through aggregation network 24 of the service provider by way of AGs 19 and edge routers (ERs) 30, and ultimately to public network 22.

Aggregation network 24 provides session management, mobility management, and transport services to support access, by subscriber devices 18B, to public network 22. Edge router 30 provides an anchor point of active sessions for subscriber devices 18B. Edge router 30 may maintain session data and operate as a termination point for communication sessions established with subscriber devices 18B that are currently accessing packet-based services of public network 22 via aggregation network 24.

In some examples, one or more of access network 27 and radio access network 25 may comprise an optical access network. For example, AX 36 may comprise an optical line terminal (OLT) connected to one or more EPs or optical network units (ONUS) via optical fiber cables. In this case, AX 36 may convert electrical signals from aggregation network 24 to optical signals using an optical emitter, i.e., a laser, and a modulator. AX 36 then transmits the modulated optical signals over one or more optical fiber cables to the CPEs, which act as termination points of the optical access network. As one example, EP 38 converts modulated optical signals received from AX 36 to electrical signals for transmission to subscriber devices 18A over copper cables. As one example, EP 38 may comprise a switch located in a neighborhood or an office or apartment complex capable of providing access to a plurality of subscriber devices 18A. In other examples, such as fiber-to-the-home (FTTH), EP 38 may comprise a gateway located directly at a single-family premise or at an individual business capable of providing access to the one or more subscriber devices 18A at the premise. In the case of radio access network 25, the EPs may be connected to wireless radios or base stations and convert the modulated optical signals to electrical signals for transmission to subscriber devices 18B via wireless signals.

Controller 35 is an SDN controller that consists of several main logical pieces: 1) South-bound protocols for configuring and enabling functionality in network devices, 2) A topology manager that maintains the topology, 3) Core modules/plugins (like Traffic engineering database, Path computation engine) that enable applications, 4) Core applications that use the protocols to provide functionality (like PCE server and OpenFlow controller), 5) User-oriented applications that solve end to end use-cases, and 6) Northbound interfaces that enable users/user-apps to talk to the Controller 35.

Modules of controller 35 can communicate using open interfaces, so that each module can be independently replaced to serve a special-purpose application or network orchestration need. Controller 35 is configured such that new modules can be added at various layers (like application layer) while re-using the functionality provided by modules at other layers. Controller 35 can communicate with other controllers at the network layer and/or the application layer to carry out the desired user functionality.

Some examples of applications that controller 35 can interface with that solve end to end use-cases include Connectivity on-demand, Firewall in-cloud, video on demand, data replication, automatic service creation (e.g., for mobile), and the like. By having a modular design, the techniques of this disclosure can provide incremental value-added services on an extensible controller 35. The plugin model allows for a third party plugins (like a different path computation engine) to be plugged into controller 35 to provide differentiated services. An example of this would be the Topology service, where static network topology file or an active topology feed using Border Gateway Protocol Traffic Engineering (BGP-TE) are allowed. The techniques of this disclosure enable the plugins and controller apps to provide RESTful APIs to application programmers. An example would be an Application-Layer Traffic Optimization (ALTO) engine would use the topology service and provide a RESTFul interface to the ALTO clients. A RESTful web service (also called a RESTful web API) is a web service implemented using Hypertext Transfer Protocol (HTTP) and the principles of Representational State Transfer (REST).

As further described herein, techniques are described herein by which a software upgrade service provides automated, in-service migration of flat file-based configuration data sets (e.g., files or data tables) for an SD WAN network application executing on controller 35 to one or more centralized, hierarchical configuration data models in which configuration data is expressed in a modeling language, such as in a YANG data model. In configuration data models such as YANG, a data modeling language is used to define data models that can easily be manipulated using standard protocols, such as the NETCONF protocol which is a network management protocol standardized by the Internet Engineering Task Force. Further details of the YANG data modeling language are described in Bjorklund, "YANG—A Data Modeling Language for the Network Configuration Protocol (NETCONF)," Internet Engineering Task Force, RFC 6020, October 2010 (available at tools.ietf.org/html/rfc6020), incorporated herein by reference. Further details of NETCONF can be are published by Enns et. al, "Network Configuration Protocol (NETCONF)," Internet Engineering Task Force, RFC 6241, June 2011, incorporated herein by reference.

The techniques may be particularly advantageous for a network device (e.g., WAN controllers, SDN controllers, multi-cloud systems, security systems, policy engines, or orchestrators) that utilizes distributed software architectures in which the components of a network application execute on virtualized elements across a set of physical devices, each distributed component operating according to a respective, locally-stored flat file-based configuration data set. In such examples, the techniques enable in-service upgrade of the software application to a software architecture, such as a microservice-based architecture, including migration of configuration data from a series of flat file-based data repositories spread across physical or virtual servers to one or more centralized configuration data models controlled by a configuration management service.

For purposes of example, the operations will be explained in reference to the example WAN controller 35 described herein. Moreover, although described with respect to a WAN controller, the techniques may be applied to any network devices in which application services initially operate according to local, flat file-based configuration data repositories and are upgraded to a new software version in which configuration data is represented by a configuration data modelling language.

Figure 2:
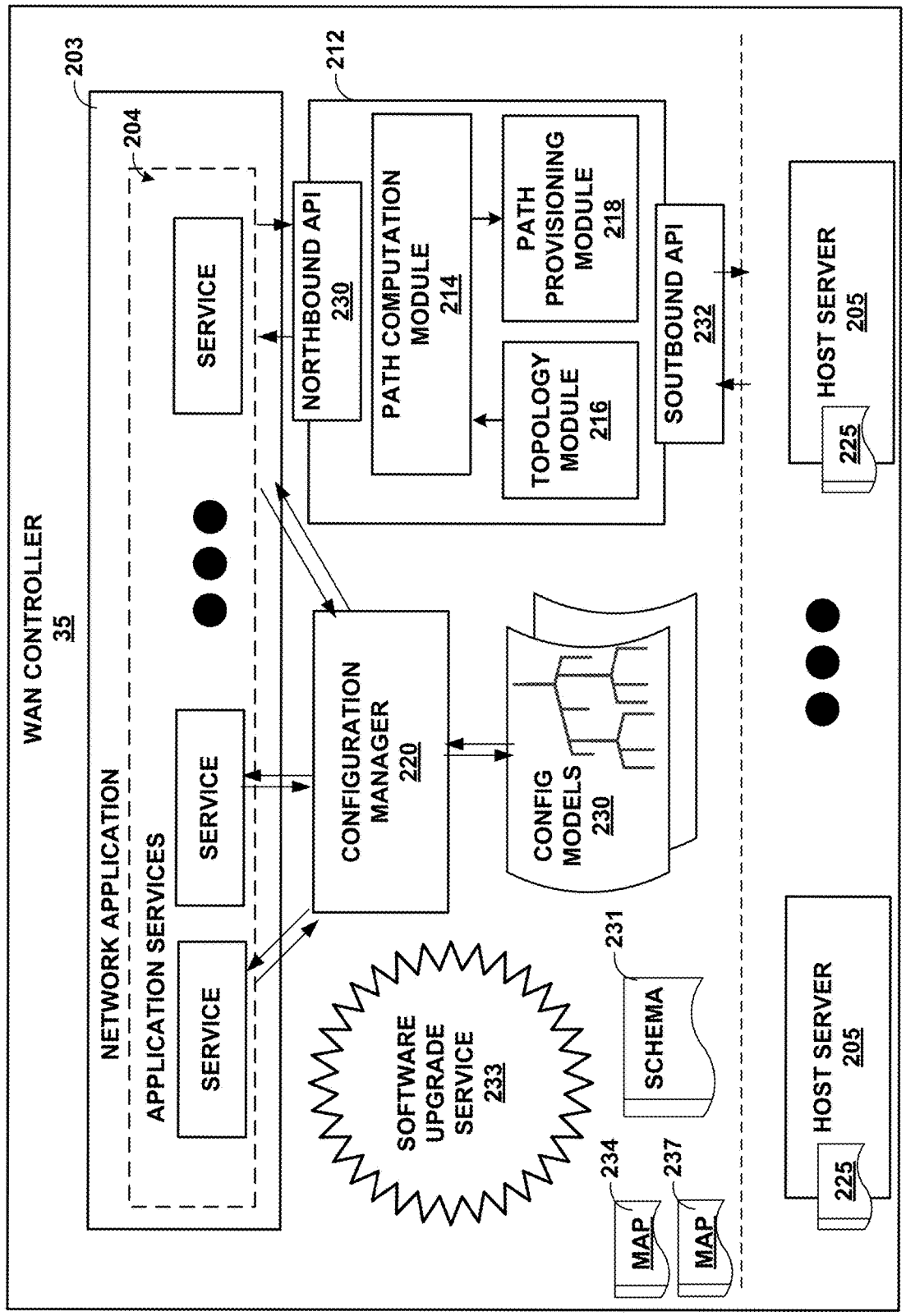
FIG. 2 is a block diagram illustrating in further detail an example WAN controller for which a software upgrade service performs a data migration process in accordance with the technique of this disclosure.

FIG. 2 is a block diagram illustrating in more detail an example WAN controller for which a software upgrade service performs a data migration process in accordance with the technique of this disclosure. In the example of FIG. 2, SD WAN controller network application 203 of WAN controller 35 is migrated from a set of standalone software applications to a distributed microservices architecture in which the functionality of the network application is implemented by a set of application services 204 executing in parallel on a plurality of virtualized elements (e.g., VMs or containers) operating on a plurality of physical host servers 205. As further described below, during this process, software upgrade service 233 upgrades the software version associated with network application 204 and, in particular, provides automated data migration from a set of legacy configuration repositories (e.g., flat files storing parameters in key-value pair format) to a set of configuration data models 230 in which configuration data is represented according to a data modeling language (e.g., YANG) and managed by a configuration manager according to a publish/subscribe architecture.

In this example, servers 205 provides an execution environment for application services 204, access authorization provisioning module 208, path computation element 212, and edge authorization provisioning module 210. As shown, these modules may be implemented as one or more processes executing on one or more virtual machines or containers executed by host servers 205.

Application services 204 represent one or more virtualized elements that provide services to clients of a network that includes WAN controller 35 to manage connectivity in the aggregation domain (alternatively referred to as the "path computation domain"). Application services 204 may, for example, be virtualized network functions that provide, for instance, segmented routing, traffic flow monitoring, telemetry, service path provisioning, firewall-in-cloud services, data replication services, connectivity scheduling services, policy deployment and enforcement services, high-availability, Voice-over-IP (VoIP), Video-on-Demand (VOD), bulk transport, walled/open garden, IP Mobility Subsystem (IMS) and other mobility services, and Internet services to clients of the service provider network. Application services 204 may leverage functions provided by path computation element 212, such as node management, session management, and policy enforcement. Each of Application services 204 may include a "north-bound" client interface (Northbound API 230) by which one or more client applications request services. That is, northbound interface 230 is an API for higher-level, external network applications, such as orchestration engines, network analyzers or network management systems, to retrieve, subscribe to, and modifying network configuration and management data.

In general, path computation element 212 and path provisional module 218 of WAN controller 35 may utilize the Path Computation Element Protocol to instantiate paths between the Path Computation Clients (e.g., routers) in network 24. Path setup may be performed through RSVP-TE signaling, which allows MPLS labels to be assigned from an ingress router to the egress router. Signaling is triggered by ingress routers in the core of the network. In some examples, WAN controller 35 provisions PCEP in all PE devices (PCCs) and uses PCEP to retrieve the current status of the existing tunnels (LSPs) that run in the network. Southbound interface 232 allows WAN controller 35 to communicate with routers and switches of the WAN network using, for example, ISIS, OSPFv2, BGP-LS, and PCEP protocols. By providing a view of the global network state and bandwidth demand in the network, path computation element 212 is able to compute optimal paths and provide the attributes that the PCC uses to signal the LSP.

In some examples, application services 204 issue path requests to path computation element 212 to request paths in a path computation domain controlled by controller 200. For example, a path request includes a required bandwidth or other constraint and two endpoints representing an access node and an edge node that communicate over the path computation domain managed by controller 200. Path requests may further specify time/date during which paths must be operational and CoS parameters (for instance, bandwidth required per class for certain paths).

Path computation element 212 accepts path requests from application services 204 to establish paths between the endpoints over the path computation domain. Paths may be requested for different times and dates and with disparate bandwidth requirements. Path computation element 212 reconciling path requests from Application services 204 to multiplex requested paths onto the path computation domain based on requested path parameters and anticipated network resource availability.

To intelligently compute and establish paths through the path computation domain, path computation element 212 includes topology module 216 to maintain topology information (e.g., a traffic engineering database) describing available resources of the path computation domain, including access, aggregation, and edge nodes, interfaces thereof, and interconnecting communication links.

Path computation module 214 of path computation element 212 computes requested paths through the path computation domain. In general, paths are unidirectional. Upon computing paths, path computation module 214 schedules the paths for provisioning by path provisioning module 218. A computed path includes path information usable by path provisioning module 218 to establish the path in the network. Provisioning a path may require path validation prior to committing the path to provide for packet transport.

Further example details of a distributed WAN controller may be found in U.S. Pat. No. 9,450,817, entitled "Software Defined Network Controller," the entire contents of which is incorporated herein by reference.

As further described herein, software upgrade service 233 provides in-service software upgrade of network application 203 of WAN controller 35, including automating migration of configuration data from legacy flat file-based configuration data sets 225 (e.g., data files or data tables with key value pairs) to centralized, hierarchical configuration data models 230 For example, network application 203 may be installed and execute as a first version of software as a standalone application (or set of applications) that operate according to configuration data within legacy configuration data repositories 225 stored locally on the host servers 205 on which the respective application executes. Configuration data sets 225 may, for example, represent legacy individual storage files of key-value pairs, i.e., storage files providing sequential lists of configuration parameters/settings and corresponding values. In other examples, configuration data sets may each be a database table in which each row corresponds to a different key-value pair.

Upon initiation of a software upgrade, such as by an administrator or network management system, software upgrade service 233 applies techniques described herein to automate data migration from the flat file-based architecture of legacy data repositories 225 to one that utilizes a one or more hierarchical configuration models 230. Each of configuration data models 230 represent configuration data in accordance with a data modeling language as a hierarchical configuration data model that include a plurality of nodes arranged in a hierarchical organization having a root node and a plurality of leaf nodes.

In accordance with the techniques described herein, one or more of the nodes (e.g., a subset or all of the nodes) of configuration data models 230 are preconfigured with external references to respective the parameters stored within the plurality of legacy data repositories 225. Moreover, in some examples, at least some of the nodes that includes the external reference(s) further includes meta data specifying at least one data transformation operation to be performed on the respective parameter stored external to the configuration data repository 225 when upgrading the software version of network applications services 204 and migrating the parameter from legacy configuration data repositories 225 to configuration data models 230.

During the data migration process, software upgrade service 233 may generate, from the plurality of hierarchical configuration data models 230, schema 231 (e.g., a JSON schema file) that defines a schema definition for the nodes within the plurality of configuration data models 230 in a hierarchical organization. Moreover, schema 231 includes, which the schema for each of the nodes, data that specifies the external references used to identify the parameters within legacy data repositories 225. Further, during the data migration process, software upgrade service 233 generates a set of data migration maps 234, 237. First data migration map 234, for example, specifies each of the key-value pairs of parameters and corresponding values currently stored within the plurality of legacy data repositories. Second data migration map 237 specifies: (i) each of the external references used within the configuration data model to identify the parameters stored within the plurality of legacy data repositories, such as names of the parameters, and (ii) for each external reference, a path to the respective node within the plurality of configuration data models that contained the external reference. Software upgrade service 233 uses data migration maps 234, 237 to perform data migration, including any necessary data transformation operations, to migrate configuration parameter and values from legacy data configuration repositories 225 to the plurality of configuration data models 230 for use with the upgrade version(s) of the network application services 204.

The techniques may be particularly advantageous for a network device such as WAN controller 35 in which a software application is upgraded from a set of one or more standalone applications to a distributed, microservice-based architecture having a plurality of services 204, including enabling the auto-migration of configuration data from a series of legacy flat file-based data repositories 225 spread across physical or virtual servers to one or more centralized configuration data models 230 controlled by a centralized configuration manager.

Figure 3:
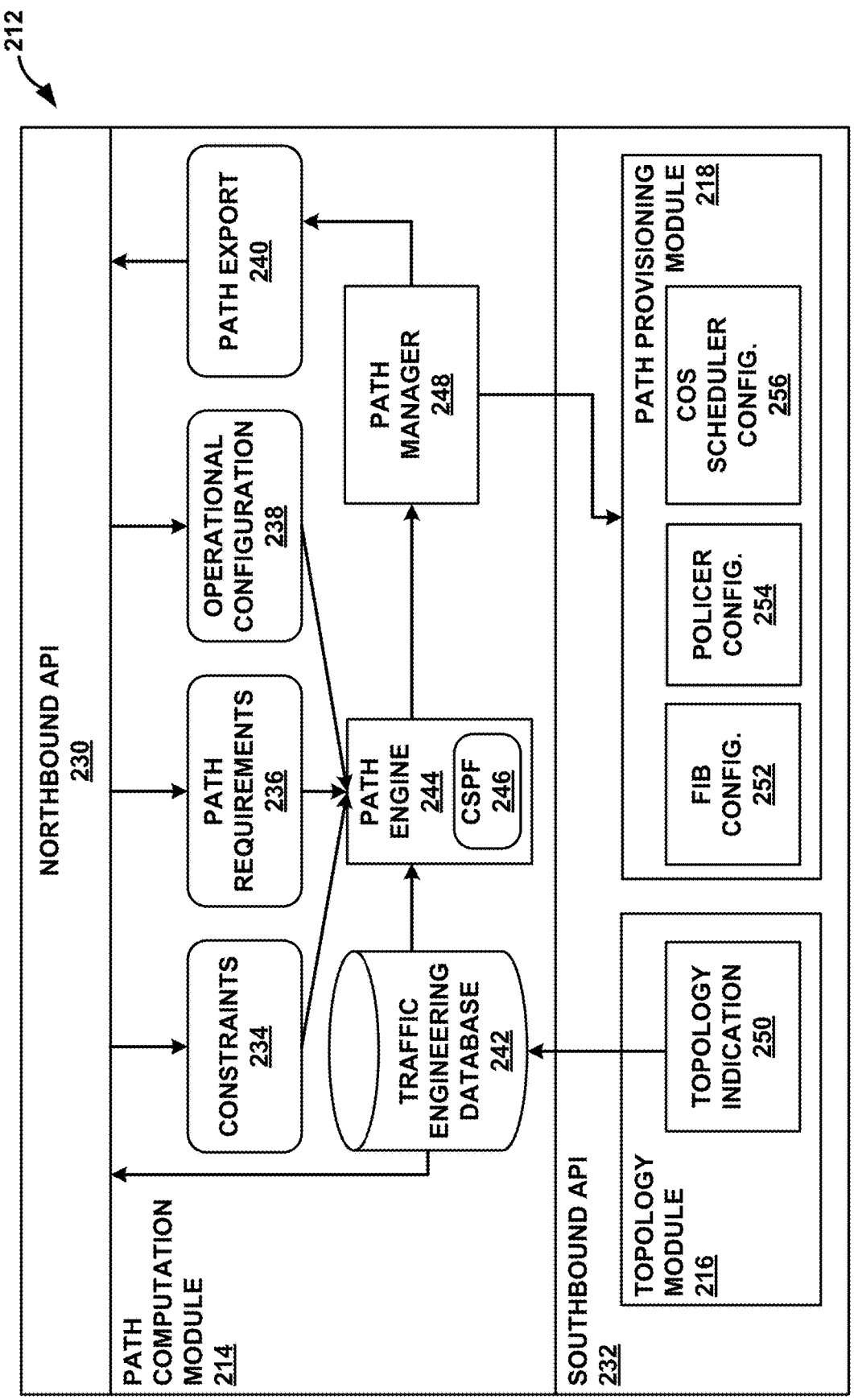
FIG. 3 is a block diagram illustrating an example implementation of a path computation element for the WAN controller of FIG. 2

FIG. 3 is a block diagram illustrating an example implementation of path computation element 212 for WAN controller 35 of FIG. 2. In this example, path computation element 212 includes northbound and southbound interfaces in the form of northbound application programming interface (API) 230 and southbound API (232). Northbound API 230 includes methods and/or accessible data structures by which Application services 204 may configure and request path computation and query established paths within the path computation domain. Southbound API 232 includes methods and/or accessible data structures by which path computation element 212 receives topology information for the path computation domain and establishes paths by accessing and programming data planes of aggregation nodes and/or access nodes within the path computation domain.

Path computation module 214 includes data structures to store path information for computing and establishing requested paths. These data structures include constraints 234, path requirements 236, operational configuration 238, and path export 240. Application services 204 may invoke northbound API 230 to install/query data from these data structures. Constraints 234 represent a data structure that describes external constraints upon path computation. Constraints 234 allow Application services 204 to, e.g., modify link attributes before path computation module 214 computes a set of paths. For examples, Radio Frequency (RF) modules (not shown) may edit links to indicate that resources are shared between a group and resources must be allocated accordingly.

Application services 204 may modify attributes of a link to effect resulting traffic engineering computations. In such instances, link attributes may override attributes received from topology indication module 250 and remain in effect for the duration of the node/attendant port in the topology. A link edit message to constraints 234 may include a link descriptor specifying a node identifier and port index, together with link attributes specifying a bandwidth, expected time to transmit, shared link group, and fate shared group, for instance. The link edit message may be sent by the PCE 214.

Operational configuration 238 represents a data structure that provides configuration information to path computation element 214 to configure the path computation algorithm with respect to, for example, class of service (CoS) descriptors and detour behaviors. Operational configuration 238 may receive operational configuration information in accordance with CCP. An operational configuration message specifies CoS value, queue depth, queue depth priority, scheduling discipline, over provisioning factors, detour type, path failure mode, and detour path failure mode, for instance. A single CoS profile may be used for the entire path computation domain. Example CoS values are described in U.S. application Ser. No. 13/842,453, filed Mar. 15, 2013, entitled "Aggregation Network with Centralized Control," the entire content of which is incorporated by reference herein. The Service Class assigned to a Class of Service may be independent of the node as an attribute of the path computation domain.

Path export 240 represents an interface that stores path descriptors for all paths currently committed or established in the path computation domain. In response to queries received via northbound API 230, path export 240 returns one or more path descriptors. Queries received may request paths between any two edge and access nodes terminating the path(s). In some examples, path descriptors may be used by Application services 204 to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour); bandwidth for each CoS value. In response to receiving the path descriptor, the receiving device may use RSVP-TE to signal an MPLS LSP from the ingress to the egress of the path.

Path requirements 236 represent an interface that receives path requests for paths to be computed by path computation module 236 and provides these path requests (including path requirements) to path engine 244 for computation. Path requirements 236 may be received, or may be handled by the PCE. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 216 includes topology indication module 250 to handle topology discovery and, where needed, to maintain control channels between path computation element 212 and nodes of the path computation domain. Topology indication module 250 may include an interface to describe received topologies to path computation module 214.

Topology indication module 250 may use a topology discovery protocol to describe the path computation domain topology to path computation module 214. In one example, using a cloud control protocol mechanism for topology discovery, topology indication module 250 may receive a list of node neighbors, with each neighbor including a node identifier, local port index, and remote port index, as well as a list of link attributes each specifying a port index, bandwidth, expected time to transmit, shared link group, and fate shared group, for instance.

Topology indication module 250 may communicate with a topology server, such as a routing protocol route reflector, to receive topology information for a network layer of the network. Topology indication module 250 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 250 may in some instances be a passive listener that neither forwards nor originates routing protocol advertisements. In some instances, topology indication module 250 may alternatively, or additionally, execute a topology discovery mechanism such as an interface for an Application-Layer Traffic Optimization (ALTO) service. Topology indication module 250 may therefore receive a digest of topology information collected by a topology server, e.g., an ALTO server, rather than executing a routing protocol to receive routing protocol advertisements directly.

In some examples, topology indication module 250 receives topology information that includes traffic engineering (TE) information. Topology indication module 250 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, indication module 250 executes BGP-TE to receive advertised TE information for inter-autonomous system and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Traffic engineering database (TED) 242 stores topology information, received by topology indication module 250, for a network that constitutes a path computation domain for controller 200 to a computer-readable storage medium (not shown). TED 242 may include one or more link-state databases (LSDBs), where link and node data is received in routing protocol advertisements, received from a topology server, and/or discovered by link-layer entities such as an overlay controller and then provided to topology indication module 250. In some instances, an operator may configure traffic engineering or other topology information within MT TED 242 via a client interface.

Path engine 244 accepts the current topology snapshot of the path computation domain in the form of TED 242 and computes, using TED 242, CoS-aware traffic-engineered paths between nodes as indicated by configured node-specific policy (constraints 234) and/or through dynamic networking with external modules via APIs. Path engine 244 may further compute detours for all primary paths on a per-CoS basis according to configured failover and capacity requirements (as specified in operational configuration 238 and path requirements 236, respectively).

In general, to compute a requested path, path engine 244 determines based on TED 242 and all specified constraints whether there exists a path in the layer that satisfies the TE specifications for the requested path for the duration of the requested time. Path engine 244 may use the Djikstra constrained SPF (CSPF) 246 path computation algorithms for identifying satisfactory paths though the path computation domain. If there are no TE constraints, path engine 244 may revert to SPF. If a satisfactory computed path for the requested path exists, path engine 244 provides a path descriptor for the computed path to path manager 248 to establish the path using path provisioning module 218. A path computed by path engine 244 may be referred to as a "computed" path, until such time as path provisioning 218 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 248 establishes computed scheduled paths using path provisioning module 218, which in this instance includes forwarding information base (FIB) configuration module 252 (illustrated as "FIB CONFIG. 252"), policer configuration module 254 (illustrated as "POLICER CONFIG. 254"), and CoS scheduler configuration module 256 (illustrated as "COS SCHEDULER CONFIG. 256").

FIB configuration module 252 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 252 may implement, for instance, a software-defined networking (SDN) protocol such as the OpenFlow protocol or the I2RS protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 252 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module interface 62 establishes communication sessions with aggregation nodes or access nodes to install forwarding information to receive path setup event information, such as confirmation that received forwarding information has been successfully installed or that received forwarding information cannot be installed (indicating FIB configuration failure). Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding I2RS are found in "Interface to the Routing System Framework," Network Working Group, Internet-draft, Jul. 30, 2012, which is incorporated by reference as if fully set forth herein.

FIB configuration module 252 may add, change (i.e., implicit add), or delete forwarding table entries in accordance with information received from path computation module 214. A FIB configuration message from path computation module 214 to FIB configuration module 252 may specify an event type (add or delete); a node identifier; a path identifier; one or more forwarding table entries each including an ingress port index, ingress label, egress port index, and egress label; and a detour path specifying a path identifier and CoS mode.

Policer configuration module 254 may be invoked by path computation module 214 to request a policer be installed on a particular aggregation node or access node for a particular LSP ingress. As noted above, the FIBs for aggregation nodes or access nodes include policers at LSP ingress. Policer configuration module 254 may receive policer configuration requests. A policer configuration request message may specify an event type (add, change, or delete); a node identifier; an LSP identifier; and, for each class of service, a list of policer information including CoS value, maximum bandwidth, burst, and drop/remark. FIB configuration module 252 configures the policers in accordance with the policer configuration requests.

CoS scheduler configuration module 256 may be invoked by path computation module 214 to request configuration of CoS scheduler on the aggregation nodes or access nodes. CoS scheduler configuration module 256 may receive the CoS scheduler configuration information. A scheduling configuration request message may specify an event type (change); a node identifier; a port identity value (port index); and configuration information specifying bandwidth, queue depth, and scheduling discipline, for instance.

As further described herein, a software upgrade service (e.g., software upgrade service 233 of FIG. 2) provides in-service software upgrade for components of WAN controller 35, which may include path computation element 212, in some examples. Further, the techniques automate the migration of configuration data from legacy flat file-based configuration data sets to centralized, hierarchical configuration data models. Upon initiation of a software upgrade, such as by an administrator or network management system, the software upgrade service applies techniques described herein to automate data migration from the flat file-based architecture of legacy data repositories to one that utilizes a one or more hierarchical configuration models 230. The techniques may be particularly advantageous for a network device, such as WAN controller 35, in which a software application is upgraded from a set of one or more standalone applications to a distributed, microservice-based architecture having a plurality of services, including enabling the auto-migration of configuration data from a series of legacy flat file-based data repositories spread across physical or virtual servers to one or more centralized configuration data models controlled by a centralized configuration manager.

Figure 4:
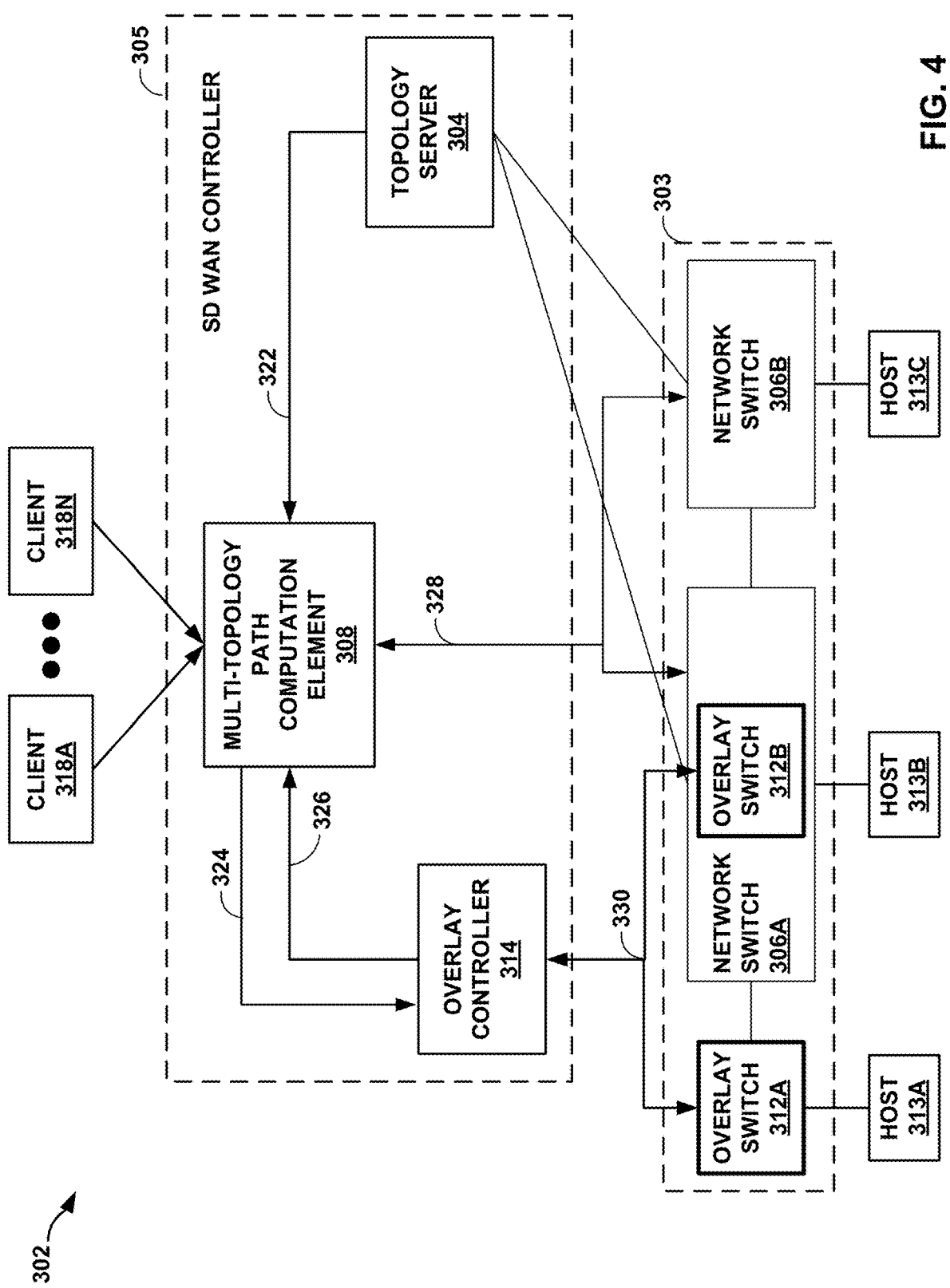
FIG. 4 is a block diagram illustrating an example network system in which seamless, in-service data migration is executed for software defined (SD) WAN controller 305 in accordance with techniques described herein.

FIG. 4 is a block diagram illustrating an example network system in which seamless, in-service data migration is executed for software defined (SD) WAN controller 305 in accordance with techniques described herein. In this example, network system 302 is a multi-topology network 302 that includes multiple layers that transport traffic between hosts 313A-313C (collectively, "hosts 313"). Hosts 313 may execute a distributed application that requires massive data transfer over network 302 at different times in a dynamic application processing environment. Each of hosts 313 may represent a data server or application processing node, for example. Network system 302 includes an SDN controller 305 that includes multi-topology path computation element 308 (also referred to as "PCE 308"), overlay controller 314, and topology server 304.

A base network layer of network 302 (or "base network") includes network switches 306A-306B (collectively, "network switches 306") connected to hosts 313B, 313C and arranged in a physical topology. Network switches 306 receive and forward packet data units (PDUs) for network flows according to forwarding information programmed into the switches by an administrator or external entity (e.g., overlay controller 314 or multi-topology path computation element 308) and/or according to forwarding information learned by the switches, whether by operation of one or more protocols (e.g., interior gateway protocols (IGPs)) or by recording information learned during PDU forwarding.

Each of network switches 306 may represent a router, a layer three ("L3") switch, a layer two ("L2") switch, an L2/L3 switch, or another network device that switches traffic according to forwarding information. Accordingly, PDUs forwarded by network switches 306A may include, for example, L3 network packets (e.g., Internet Protocol) packets and/or L2 packets (e.g., Ethernet datagrams or Asynchronous Transfer Mode (ATM) cells). PDUs may be unicast, multicast, anycast, and/or broadcast.

An overlay network layer of network 302 includes overlay switches 312A-312B (collectively, "overlay switches 312") arranged in a virtual topology "over" a physical topology defined by network switches 306. Individual links of the virtual topology of the overlay network (or "overlay links") may be established paths through the base network and/or physical links connecting overlay switches 312. The overlay network may represent a virtual private network (VPN), an OpenFlow network consisting of one or more OpenFlow switches, or an application-layer network with selection functionality built-in to endpoint devices, for example. Accordingly, each of overlay switches 312 may represent a router or routing instance (e.g., a virtual routing and forwarding (VRF) instance); a Virtual Private Local Area Network (LAN) Service (VPLS) instance; a dedicated L2, L3, or L2/L3 switch; or a virtual or "soft" switch (e.g., an OpenFlow switch) implemented by a router or by a dedicated switch, for example. Overlay switch 312A, for instance, represents a dedicated overlay switch. Overlay switch 312B is implemented by network switch 306A and may represent, for instance, a soft switch. Network 302 may include multiple overlay network layers of different or similar types (e.g., multiple VPNs and/or OpenFlow networks).

Topology server 304 receives topology information from network switches 306 for the base network of multi-topology network 302. For example, topology server 304 may execute one or more IGPs or Exterior Gateway Protocols (e.g., the Border Gateway Protocol (BGP)) to listen to routing protocol advertisements sent by network switches 306. Topology server 304 collects and stores the base network topology information, then provides the base network topology information to multi-topology path computation element (PCE) 308 in base topology update messages 322. Topology information may include traffic engineering information for the network links, such as the links' administrative attributes and bandwidth at various priority levels available for use by label-switched paths (LSPs). In some examples, network switches 306 may send topology update messages to topology server 304 that specify L2 link information for L2 links connecting the network switches. In some examples, topology server 304 is a component of PCE 308.

Overlay controller 314 receives topology information for the overlay network of multi-topology network 302 in topology update messages sent by overlay switches 312 in respective communication sessions 330. Topology update messages sent by overlay switches 312 may include virtual and physical switch port information, PDUs and associated metadata specifying respective ports and/or interfaces on which PDUs are received. In some examples, overlay controller 314 is a routing protocol listener that executes one or more routing protocols to receive routing protocol advertisements sent by overlay switches 312. Such routing protocol advertisements may be associated with one or more VRFs, for instance. Overlay controller 314 collects and stores the overlay topology information, then provides the overlay topology information to PCE 308 in overlay topology update messages 326. In some examples, overlay controller 314 is a component of PCE 308.

Network switches 306 may be configured to or otherwise directed to establish paths through the base network of multi-topology network 302. Such paths may include, for instance, IP tunnels such as Generic Route Encapsulation (GRE) tunnels, General Packet Radio Service (GPRS) Tunneling Protocol (GTP) tunnels, LSPs, or a simple route through the base network or a VPN (identified by a static route with a route target, for instance). Network switches 306 provide path status information for paths established through the base network of multi-topology network to PCE 308 in communication sessions 328. Path status (alternatively, "path state" or "LSP state") information may include descriptors for existing, operational paths as well as indications that an established path or path setup operation has failed. For example, network switch 306A may attempt establish an LSP using a reservation protocol such as Resource reSerVation Protocol (RSVP) but fail due to insufficient network resources along a path specified by an Explicit Route Object (ERO). As a result, network switch 306A may provide an indication that the path setup operation failed to PCE 308 in a communication session 328. PCE 308 receives path status information and adds established paths through the base network of network 302 as links in the overlay network topology.

PCE 308 presents an interface by which clients 318A-318N (collectively, "clients 318") may request, for a specified time, a dedicated path between any combination of hosts 313. For example, client 318A may request a 100 MB/s path from host 313A to host 313B from 1 PM to 3 PM on a particular date. As another example, client 318N may request a 50 MB/s path from host 313A to host 313C from 2 PM to 3 PM on the same date. As a still further example, client 318A may request a mesh (or "multipath") of 50 MB/s paths connecting each of hosts 313 to one another from 4 PM to 6 PM on a particular date. The requested mesh is a multipoint-to-multipoint path consisting of multiple point-to-point paths. In addition to the bandwidth, hosts, and time path parameters exemplified above, clients 318 may request paths that conform to other quality of service (QoS) path request parameters, such as latency and jitter, and may further specify additional associated classifiers to identify a flow between the specified endpoints. Example flow classifiers (or "parameters") are provided below.

PCE 308 uses base network topology information for network 302 received from topology server 304, overlay network topology information for network 302 received from overlay controller 314, and path status information received from network switches 306 to compute and schedule paths between hosts 313 through network 302 that satisfy the parameters for the paths requested by clients 318. PCE 308 may receive multiple path requests from clients 318 that overlap in time. PCE 308 reconciles these requests by scheduling corresponding paths for the path requests that traverse different parts of network 302 and increase capacity utilization, for example, or by denying some of the path requests.

At the scheduled time for a scheduled path, PCE 308 installs forwarding information to network 302 nodes (e.g., overlay switches 312 and network switches 306) to cause the nodes to forward traffic in a manner that satisfies the requested path parameters. In some examples, PCE 308 stores all path requests and then attempts to compute and establish paths at respective requested times. In some examples, PCE 308 receives path requests and schedules respective, satisfactory paths in advance of the requested times. PCE 308, in such examples, stores the scheduled paths and uses resources allocated (in advance) for the scheduled paths as a constraint when attempting to compute and schedule later requested paths. For example, where a scheduled path will consume all available bandwidth on a particular link at a particular time, PCE 308 may later compute a requested path at an overlapping time such that the later requested path does not include the completely subscribed link.

A requested path may traverse either or both domains of network 302. That is, a requested path may traverse either or both of the base network and overlay network of multi-topology network 302. For example, because both host 313B and host 313C couple in the base network domain to one of network switches 306, a requested path for traffic from host 313B to host 313C may traverse only the base network domain as a simple network route, for instance, from network switch 306A to network switch 306B. Host 313A, however, couples in the overlay network domain to overlay switch 312A. As a result, any requested path for traffic between host 313A and host 313C, for example, first traverses the overlay network domain and then traverses the base network domain.

PCE 308 installs forwarding information to overlay switches 312 using overlay controller 314. Overlay controller 314 presents a programming interface by which PCE 308 may add, delete, and modify forwarding information in overlay switches 312. Forwarding information of overlay switches 312 may include a flow table having one or more entries that specify field values for matching PDU properties and a set of forwarding actions to apply to matching PDUs. A set of one or more PDUs that match a particular flow entries represent a flow. Flows may be broadly classified using any parameter of a PDU, such as source and destination MAC and IP addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

PCE 308 invokes the programming interface of overlay controller 314 by sending overlay network path setup messages 324 directing overlay controller 314 to establish paths in the overlay network of network 302 and/or steer flows from hosts 313 onto established paths. Overlay controller 314 responds to overlay network path setup messages 324 by installing, to overlay switches 312 using communication sessions 330, forwarding information that implements the paths and/or directs flows received from hosts 313 onto established paths.

PCE 308 installs forwarding information to network switches 306 using communication sessions 328. Each of network switches 306 may present a programming interface in the form of a management interface, configuration interface, and/or a path computation client (PCC). PCE 308 may invoke the programming interface of network switches 306 to configure a tunnel (e.g., an LSP), install static routes, configure a VPLS instance, configure an Integrated Routing and Bridging (IRB) interface, and to otherwise configure network switches 306 to forward packet flows in a specified manner. In some instances, PCE 308 directs one or more of networks switches 306 to signal a traffic engineered LSP (TE LSP) through the base network of network 302 to establish a path. In this way, PCE 308 may program a scheduled path through network 302 by invoking a programming interface of only the head network device for the path.

At the end of a scheduled time for a requested path, PCE 308 may again invoke the programming interfaces of network switches 306 and overlay switches 312 to remove forwarding information implementing the requested paths. In this way, PCE 308 frees resources for future scheduled paths.

Because PCE 308 has an enhanced view of the current state of the network 302 at both the overlay network layer and base network 302, PCE 308 may identify paths that are not visible to any one of network switches 306 or overlay switches 312 having a more limited view. PCE 308 may additionally, by virtue of having access to this enhanced view, steer traffic to underutilized portions of network 302 to increase capacity utilization of network 302. In addition, centralizing the path computation and establishment with PCE 308 may allow network operators to reconcile multiple, possibly conflicting application path requests and may reduce first-in-time, first-in-right access to network resources in favor of explicit, centralized prioritization of application requests for dedicated paths.

In accordance with the techniques described herein, a software upgrade service (e.g., a software upgrade service 233 of FIG. 2) provides in-service software upgrade for components of WAN controller 308, including automating data migration from the flat file-based architecture of legacy data repositories to one that utilizes a one or more hierarchical configuration models.

Figure 5:
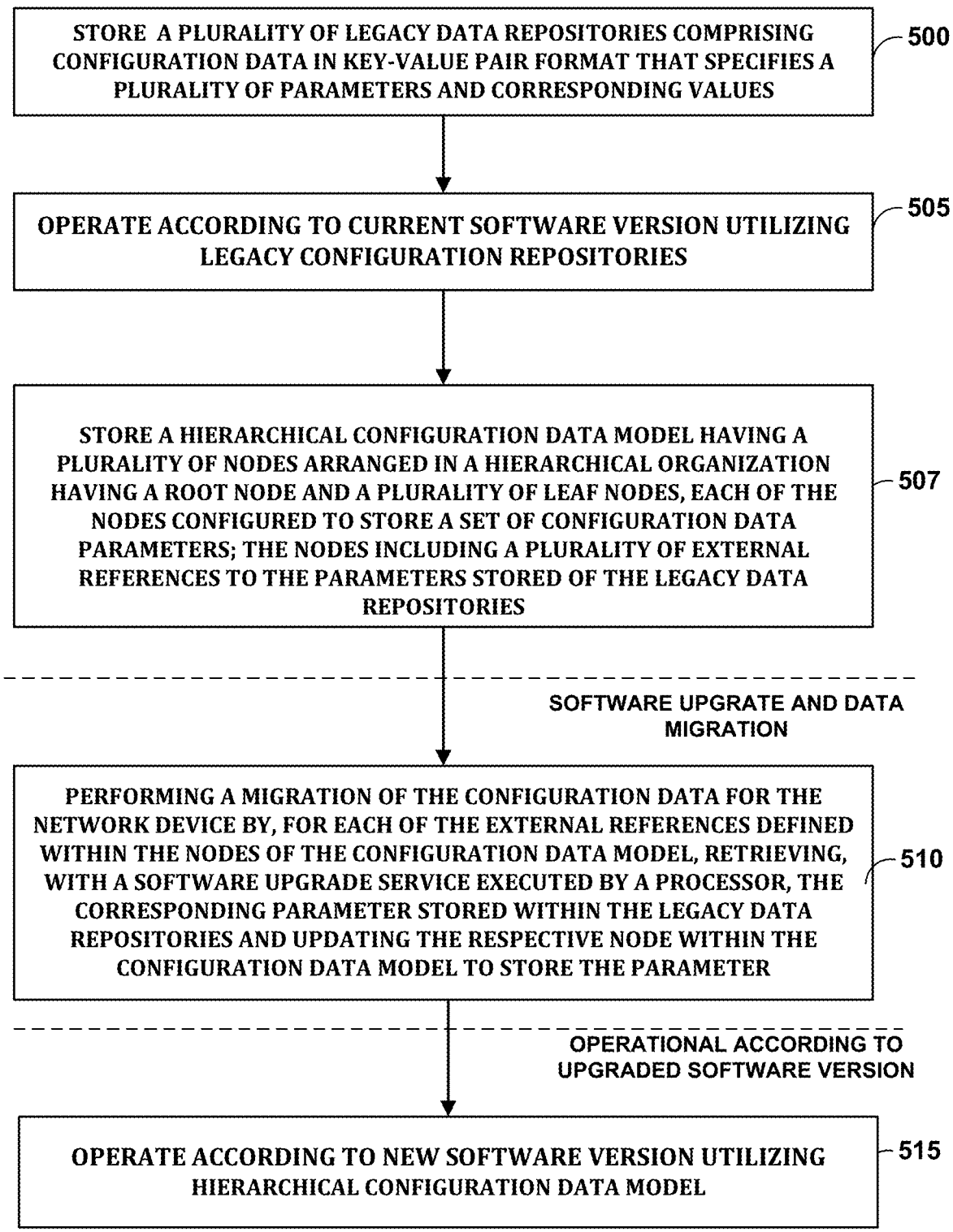
FIG. 5 is a flow diagram illustrating example operations for seamlessly migrating configuration data when performing a software version upgrade for a network device, in accordance with one or more techniques of this disclosure.

FIG. 5 is a flow diagram illustrating example operations for seamlessly migrating configuration data when performing a software version upgrade for a network device, in accordance with one or more techniques of this disclosure. For purposes of example, the operations will be explained in reference to the example WAN controller 35 described herein.

As seen in the example of FIG. 5, WAN controller 35 may be configured to store, on one or more computer-readable media distributed across host servers 205, a plurality of legacy data repositories 225 comprising configuration data for WAN controller 35 in key-value pair format that specifies a plurality of parameters and corresponding values for operation of the network device (500). In this initial configuration, a network application of a current software version utilizes legacy configuration repositories 225 for configuration data to control current operations of WAN controller 35 (507).

Next, WAN controller 35 may be configured to store a hierarchical configuration data model 230, wherein the configuration data model includes a plurality of nodes arranged in a hierarchical organization having a root node and a plurality of leaf nodes, wherein each of the nodes of the configuration data model is configured to store a set of configuration data parameters for the network device, and wherein one or more of the nodes includes a plurality of external references to respective the parameters stored within the plurality of legacy data repositories (505). In this mode, WAN controller 35 may continue to execute network application 203, e.g., as a set of standalone applications that operate according to legacy configuration data repositories 225. Moreover, hierarchical configuration data model(s) 230 may be configured with external references to the configuration data of repositories 225 in preparations for an in-service software upgrade and data migration at some time in the future.

Next, software upgrade service 233 performs a software update for network services 204 (e.g., to a micro-service-base architecture that utilizes a publish/subscribe model for receiving configuration data from configuration manager 220) and, at this time, performs a migration of the configuration data for the network device by, for each of the external references defined within the nodes of configuration data model 230, retrieving the corresponding parameter stored within the legacy data repositories 225 and updating the respective node within the configuration data model 230 to store the parameter (510). In this configuration, application services 204 operate according to the new software version and utilize configuration data of configuration data model 230, as published by configuration manager 220, to control current operations of WAN controller 35 (515).

Figure 6:
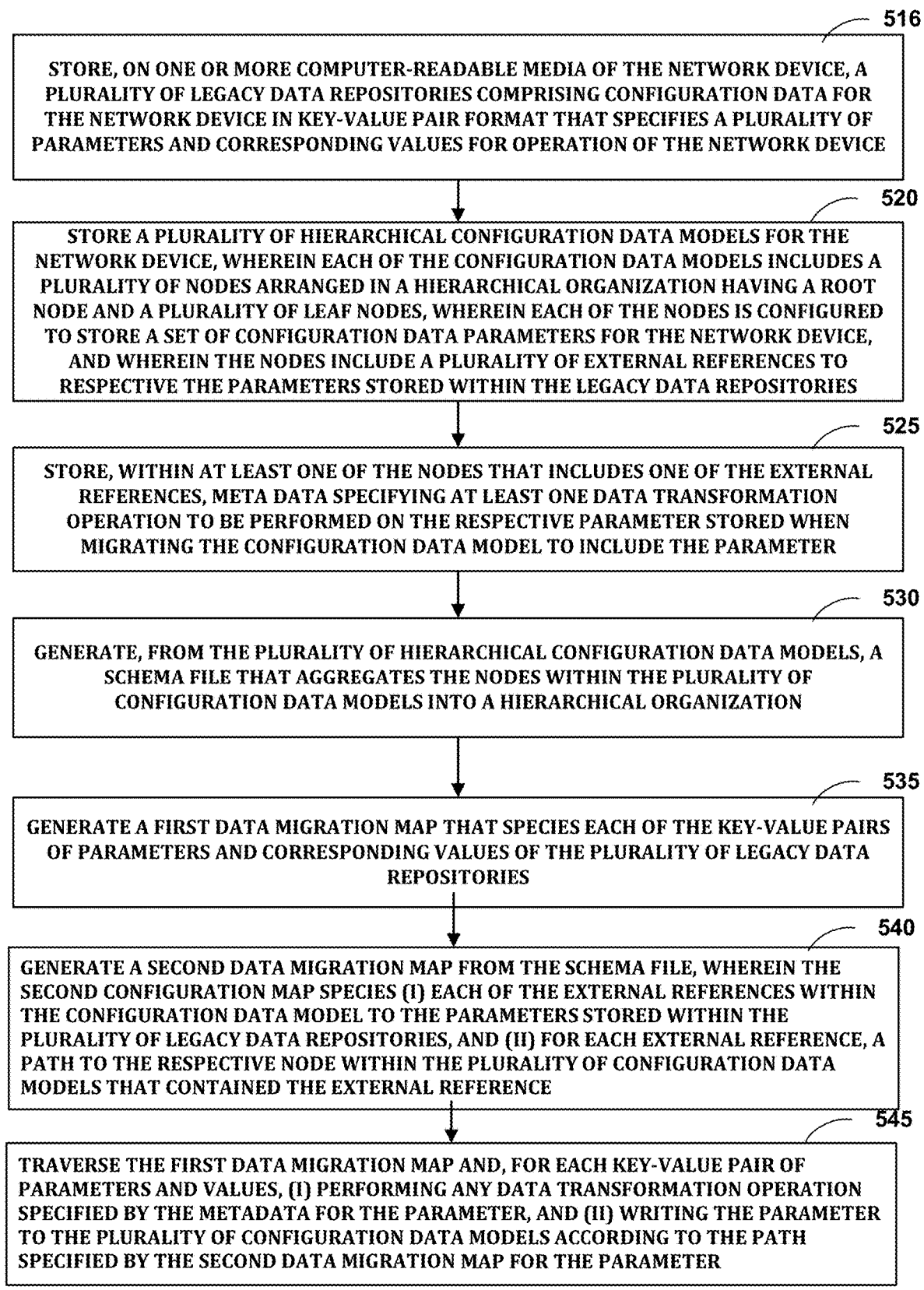
FIG. 6 is another flow diagram illustrating example operations for seamlessly migrating configuration data when performing a software version upgrade for a network device, in accordance with one or more techniques of this disclosure.

FIG. 6 is another flow diagram illustrating example operations for seamlessly migrating configuration data when performing a software version upgrade for a network device, in accordance with one or more techniques of this disclosure.

Initially, a network device is configured to store, on one or more computer-readable media of the network device, a plurality of legacy data repositories 225 comprising configuration data for the network device in key-value pair format that specifies a plurality of parameters and corresponding values for operation of the network device (516).

In addition, the network device may be configured store a plurality of hierarchical configuration data models, wherein each of the configuration data models include a plurality of nodes arranged in a hierarchical organization having a root node and a plurality of leaf nodes, wherein each of the nodes is configured to store a set of configuration data parameters for the network device, and wherein one or more of the nodes includes a plurality of external references to respective the parameters stored within the plurality of legacy data repositories (520). Further, at least one of the nodes may be configured to store one of the external references, meta data specifying at least one data transformation operation to be performed on the respective parameter stored external to the configuration data model when migrating the configuration data model to include the parameter (525).

A software upgrade service (e.g., a process, module or script executing on a device, server or management system) may generate, from the plurality of hierarchical configuration data models, a schema file that aggregates the nodes within the plurality of configuration data models into a hierarchical organization and includes within the aggregate nodes the plurality of external references to the parameters of the plurality of legacy data repositories (530). Further, the software upgrade service may generate a first data migration map that specifies each of the key-value pairs of parameters and corresponding values of the plurality of legacy data repositories (535). In addition, the software upgrade service may generate a second data migration map from the schema file, wherein the second configuration map specifies (i) each of the external references within the configuration data model to the parameters stored within the plurality of legacy data repositories, and (ii) for each external reference, a path to the respective node within the plurality of configuration data models that contained the external reference (540). The software upgrade service 233 traverses the first data migration map and, for each key-value pair of parameters and values of first data migration map, (i) performs any data transformation operation specified by the metadata for the parameter, and (ii) writes the parameter to the plurality of configuration data models according to the path specified by the second data migration map for the parameter (545).

Example Legacy Configuration Data Repositories and Configuration Data Models

The following represents textual data in key-value pair format from a plurality of different legacy configuration data repositories 225 associated with network application 203. In the additional examples below, reference will be made to three example settings:

--- es_rollup_cutoff_days, hm_poll_interval, and netflow_workers.

```
# num of reconnection attempts (-1=infinite retry)
mq_reconnect_retries=-1
# the delay in milliseconds to wait between connection retries
mq_reconnect_delay_ms=1000
# delay in ms for database reconnection attempt
db_reconnect_delay_ms=5000
#number of threads for the connection pool (default=4)
db_num_threads=4
#pending commits before pushing to database (default=1000)
db_batch_size=1000
#how long to wait before committing and unfilled batch
(default=1sec)
db_batch_wait_sec=1
#sleep in ms to check on pending db write queue (default=10ms)
db_batch_sleep_ms=10
es_rollup_cutoff_days=7
hm_poll_interval=10
# netflowd settings
netflow_port=7876
netflow_ssl=0
netflow_log_level=info
netflow_sampling_interval = 30
netflow_workers=16
```

---

The following represents an example of configuration data 230 of two YANG configuration data models 230 (System model and an Analytics model) corresponding to the three key-value pairs of the example legacy configuration data repository listed above, i.e., es_rollup_cutoff_days, hm_poll_interval, and netflow_workers. As seen in this example, the example portion of a YANG configuration data model includes data model language definitions for three corresponding leaf nodes (objects) corresponding to the configuration data from the example legacy configuration data repository: (i) rollup-query-cutoff-interval node, (ii) poll-interval leaf node, and (iii) a workers leaf node. Moreover, each leaf node within the YANG configuration model defines respective configuration data types for each node (e.g., string, uint8) and, instead of defining a local data value or setting within the node, incudes an external reference to a key (e.g., parameter name) of the corresponding key-value pair within the example legacy configuration data repository listed above. In this way, each of the example nodes of the YANG configuration data model listed below identifies a respective key-value pair within the legacy configuration data. Further, in this example, the first two example leaf node includes additional metadata data defining transformation operation to be applied to the parameter stored external to the YANG configuration data model when performing a software upgrade on distributed network application 203 and migrating the example parameters from the example legacy configuration data repository listed above into the example YANG configuration data model. In this example, the metadata within the first example leaf node rollup-query-cutoff-interval specifies the data transformation operation of appending a unit "d" onto the parameter es_rollup_cutoff_days when retrieving the parameter from the legacy data, thus generating a string such as "7d" upon reading a legacy value of "7." Similarly, the metadata within the second example leaf node poll-interval specifies the data transformation operation of appending a unit "m" onto the parameter hm_poll_interval when retrieving the parameter from the legacy data, thus generating a string such as "4m" upon reading a legacy value of "4." Example data transformation that may be defined include prepending characters, appending characters, string substitution, splitting, pattern matching, scaling and the like.

---

```
System Model {
    leaf rollup-query-cutoff-interval {
        type string {
            pattern '[0-9]+(d|days)';
        }
        description
            "If set, and the requested time range is more than cutoff-interval
            from now, query will use roll-up index (hourly aggregated data)
            to search data. Can be expressed as days ('d' or 'days').
            Examples: 7d, 7days.";
        default "7d";
        junos-internal:legacy-name "es_rollup_cutoff_days";
        junos-internal:legacy-unit "d";
    }
    ...
    leaf poll-interval {
        type string {
            pattern
                '[0-9]+(m|minutes)';
        }
        description
            "Health monitor poll interval. Can be expressed as minutes
            ('m' or 'minutes'). Examples: 4m, 4minutes. (default=10m)";
        default "10m";
        junos-internal:legacy-name "hm_poll_interval";
        junos-internal:legacy-unit "m";
    }
}
...
Analytics Model {
    leaf workers {
        type uint8;
        description
            "Number of worker processes to start, when set to '0'
            it takes the number of cores in the system(default=1)";
        default 1;
        junos-internal:legacy-name "netflow_workers";
    }
}
```

---

The following represents an example JSON schema file generated by software upgrade service 233 from the above example YANG configuration data models when performing a data migration in accordance with the techniques described herein. As shown, the JSON schema file specifies schema information that aggregates and define a hierarchy of objects for the three leaf nodes (rollup-query-cutoff-interval node) poll-interval leaf node, and workers leaf node) of the YANG configuration data model. As shown, the example JSON schema file aggregates the nodes into a hierarchical organization and includes within the aggregate nodes the external references specified within the YANG configuration data model;

```
{
    "leaf": {
        "description": {
            "text": "If set, and the requested time range is more than cutoff-
interval from\nnow, query will use roll-up index (hourly aggregated data)
to search\ndata. Can be expressed as days ('d' or 'days'). Examples: 7d,
7days".
        },
        "@name": "rollup-query-cutoff-interval",
        "junos-internal:legacy-name": {
            "@value": "es_rollup_cutoff_days"
        },
```

-continued

```
        "type": {
            "pattern": {
                "@value": "[0-9]+(d|days)"
            },
            "@name": "string"
        },
        "default": {
            "@value": "7d"
        },
        "junos-internal:legacy-unit": {
            "@value": "d"
        }
    },
    "@name": "enable-case"
}
{
    "description": {
        "text": "Health monitor poll interval. Can be expressed as
('m' or\n'minutes'). Examples: 4m, 4minutes. (default=10m)"minutes
    },
    "@name": "poll-interval",
    "junos-internal:legacy-name": {
        "@value": "hm_poll_interval"
    },
    "type": {
        "pattern": {
            "@value": "[0-9]+(m|minutes)"
        },
        "@name": "string"
    },
    "default": {
        "@value": "10m"
    },
    "junos-internal:legacy-unit": {
        "@value": "m"
    }
}
{
    "junos-internal:legacy-name": {
        "@value": "netflow_workers"
    },
    "default": {
        "@value": "1"
    },
    "description": {
        "text": "Number of worker processes to start, when set to '0' it
takes the\nnumber of cores in the system(default=1)"
    },
    "@name": "workers",
    "type": {
        "@name": "uint8"
    }
}
```

The following represents example operations produced and applied by software upgrade service 233 when processing the above example legacy configuration data and YANG configuration model. As shown, software update service 233 processes the JSON schema file to retrieve the corresponding values for each of the parameters from the legacy configuration data, applies the specified data transformation and sets the value within the centralized YANG configuration models according to the schema definitions and updates the appropriate model to reflect the result.

set SD_WAN_APPLICATION analytics_model rollup-query-cutoff-interval 7d set SD_WAN_APPLICATION system_model health-monitor poll-interval 10m set SD_WAN_APPLICATION analytics_model netflowd workers 16

EXAMPLES

Example 1: A method for migrating configuration data for a network device that includes storing, on one or more computer-readable media of the network device, a plurality of legacy data repositories comprising configuration data for the network device in a key-value pair format that specifies a plurality of parameters and corresponding values for operation of the network device; storing a hierarchical configuration data model for the network device, wherein the configuration data model includes a plurality of nodes arranged in a hierarchical organization having a root node and a plurality of leaf nodes, wherein each of the nodes of the configuration data model is configured to store a set of configuration data parameters for the network device, and wherein the nodes include a plurality of external references to respective parameters of the plurality of parameters stored within the plurality of legacy data repositories; and performing a migration of the configuration data for the network device by, for each of the external references defined within the nodes of the configuration data model, retrieving, with a software upgrade service executed by a processor, the respective parameter stored within the legacy data repositories and updating the respective node within the configuration data model to store the parameter.

Example 2: The method of example 1, wherein the hierarchical configuration data model comprises one of a plurality of hierarchical configuration data models, and wherein performing a migration of the configuration data comprises: generating, from the plurality of hierarchical configuration data models, a schema file that aggregates the nodes within the plurality of configuration data models into a hierarchical organization and includes within the aggregate nodes the plurality of external references to the parameters of the plurality of legacy data repositories; and processing, with the software upgrade service, the schema file to identify each of the external references; retrieving each of the parameters specified by the external references; and updating the nodes within the plurality of configuration data models to store the retrieved parameters within the respective nodes that include the external references.

Example 3: The method of example 2, wherein the schema file comprises a JSON schema file containing a plurality of objects representing the nodes from the plurality of configuration data files, and wherein the plurality of configuration data models comprises YANG configuration data models.

Example 4: The method of example 1, wherein the configuration data model comprises a YANG configuration data model.

Example 5: The method of example 1, wherein performing a migration of the configuration data comprises: generating a first data migration map that specifies each of the key-value pairs of parameters and corresponding values of the plurality of legacy data repositories; generating a second data migration map from the schema file, wherein the second configuration map specifies (i) each of the external references within the configuration data model to the parameters stored within the plurality of legacy data repositories, and (ii) for each external reference, a path to the respective node within the plurality of configuration data models that contained the external reference; and applying the first data migration map and the second data migration map to retrieve each of the parameters specified by the external references and update the nodes within the plurality of configuration data models to store the retrieved parameters within the respective nodes that include the external references.

Example 6: The method of example 1, wherein storing a hierarchical configuration data model further includes storing, with at least one of the nodes that includes one of the external references, meta data specifying at least one data transformation operation to be performed on the parameter stored external to the configuration data model when migrating the configuration data model to include the parameter.

Example 7: A method for migrating configuration data for a network device that includes storing, on one or more computer-readable media of the network device, a plurality of legacy data repositories comprising configuration data for the network device in key-value pair format that specifies a plurality of parameters and corresponding values for operation of the network device; storing a plurality of hierarchical configuration data models for the network device, wherein each of the configuration data models includes a plurality of nodes arranged in a hierarchical organization having a root node and a plurality of leaf nodes, wherein each of the nodes is configured to store a set of configuration data parameters for the network device, and wherein one or more of the nodes includes a plurality of external references to respective parameters of the plurality of parameters stored within the plurality of legacy data repositories; storing, with at least one of the nodes that includes one of the external references, meta data specifying at least one data transformation operation to be performed on the respective parameter stored external to the configuration data model when migrating the configuration data model to include the parameter; generating, from the plurality of hierarchical configuration data models, a schema file that aggregates the nodes within the plurality of configuration data models into a hierarchical organization and includes within the aggregate nodes the plurality of external references to the parameters of the plurality of legacy data repositories; generating a first data migration map that specifies each of the key-value pairs of parameters and corresponding values of the plurality of legacy data repositories; generating a second data migration map from the schema file, wherein the second configuration map specifies (i) each of the external references within the configuration data model to the parameters stored within the plurality of legacy data repositories, and (ii) for each external reference, a path to the respective node within the plurality of configuration data models that contained the external reference; and traversing the first data migration map and, for each key-value pair of parameters and values of first data migration map, (i) performing any data transformation operation specified by the metadata for the parameter, and (ii) writing the parameter to the plurality of configuration data models according to the path specified by the second data migration map for the parameter.

Example 8: The method of example 7, wherein the schema file comprises a JSON schema file containing a plurality of objects representing the nodes from the plurality of configuration data files, and wherein the plurality of configuration data models comprises YANG configuration data models.

Example 9: A network device that includes one or more computer-readable media storing data that includes a plurality of legacy data repositories comprising configuration data for the network device in key-value pair format that specifies a plurality of parameters and corresponding values for operation of the network device; a hierarchical configuration data model having a plurality of nodes arranged in a hierarchical organization having a root node and a plurality of leaf nodes, wherein each of the nodes of the configuration data model is configured to store a set of configuration data parameters for the network device, and wherein one or more of the nodes includes a plurality of external references to respective parameters of the plurality of parameters stored within the plurality of legacy data repositories; and process circuitry configured to perform a migration of the configuration data for the network device by, for each of the external references defined within the nodes of the configuration data model, retrieving, with a software upgrade service executed by a processor, the corresponding parameter stored within the legacy data repositories and updating the respective node within the configuration data model to store the parameter.

Example 10: The device of example 9, wherein the hierarchical configuration data model comprises one of a plurality of hierarchical configuration data models, and wherein to perform a migration of the configuration data comprises: generate, from the plurality of hierarchical configuration data models, a schema file that aggregates the nodes within the plurality of configuration data models into a hierarchical organization and includes within the aggregate nodes the plurality of external references to the parameters of the plurality of legacy data repositories; process, with the software upgrade service, the schema file to identify each of the external references; retrieve each of the parameters specified by the external references; and update the nodes within the plurality of configuration data models to store the retrieved parameters within the respective nodes that include the external references.

Example 11: The device of example 10, wherein the schema file comprises a JSON schema file containing a plurality of objects representing the nodes from the plurality of configuration data files, and wherein the plurality of configuration data models comprises YANG configuration data models.

Example 12: The device of example 9, wherein the configuration data model comprises a YANG configuration data model.

Example 13: The device of example 9, wherein the processing circuitry is configured to: generate a first data migration map that specifies each of the key-value pairs of parameters and corresponding values of the plurality of legacy data repositories; generate a second data migration map from the schema file, wherein the second configuration map specifies (i) each of the external references within the configuration data model to the parameters stored within the plurality of legacy data repositories, and (ii) for each external reference, a path to the respective node within the plurality of configuration data models that contained the external reference; and apply the first data migration map and the second data migration map to retrieve each of the parameters specified by the external references and update the nodes within the plurality of configuration data models to store the retrieved parameters within the respective nodes that include the external references.

Example 14: The device of example 9, wherein the hierarchical configuration data model includes meta data specifying at least one data transformation operation to be performed on the parameter stored external to the configuration data model when migrating the configuration data model to include the parameter.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium or computer-readable storage device may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method for migrating configuration data for a network device, the method comprising:
storing, on one or more computer-readable media of the network device, a plurality of legacy data repositories comprising the configuration data for the network device in key-value pairs that specify a plurality of parameters and corresponding values for operation of the network device;
storing a hierarchical configuration data model for the network device, wherein the hierarchical configuration data model includes a plurality of nodes arranged in a hierarchical organization having a root node and a plurality of leaf nodes,
wherein each of the plurality of nodes of the hierarchical configuration data model is configured to store a set of configuration data parameters for the network device, and
wherein the plurality of nodes include a plurality of external references to respective parameters of the plurality of parameters; and
performing a migration of the configuration data for the network device by:
generating a first data migration map that specifies each of the key-value pairs of the plurality of parameters and the corresponding values for operation of the network device;
generating a second data migration map, wherein the second data migration map specifies (i) the plurality of external references within the hierarchical configuration data model to the respective parameters of the plurality of parameters, and (ii) for each external reference of the plurality of external references, a path to a corresponding node of the plurality of nodes of the hierarchical configuration data model; and
for each external reference of the plurality of external references defined within the plurality of nodes of the hierarchical configuration data model, applying the first data migration map and the second data migration map to retrieve, with a software upgrade service executed by a processor, the parameter referenced by the external reference and stored within the plurality of legacy data repositories, and updating at least one of the plurality of nodes within the hierarchical configuration data model to store the parameter referenced by the external reference.

2. The method of claim 1,
wherein the hierarchical configuration data model comprises one of a plurality of hierarchical configuration data models, and
wherein performing the migration of the configuration data for the network device comprises:
generating, from the plurality of hierarchical configuration data models, a schema file that aggregates the plurality of nodes of the plurality of hierarchical configuration data models into the hierarchical organization and includes, within the plurality of nodes, the plurality of external references to the plurality of parameters; and
processing, with the software upgrade service, the schema file to identify each external reference of the plurality of external references.

3. The method of claim 2,
wherein the schema file comprises a JavaScript Object Notation (JSON) schema file containing a plurality of objects representing the plurality of nodes from the plurality of hierarchical configuration data models, and
wherein the plurality of hierarchical configuration data models comprises Yet Another Next Generation (YANG) configuration data models.

4. The method of claim 1, wherein the hierarchical configuration data model comprises a Yet Another Next Generation (YANG) configuration data model.

5. The method of claim 1, wherein storing the hierarchical configuration data model further includes storing, with at least one node of the plurality of nodes that includes one of the plurality of external references, metadata specifying at least one data transformation operation to be performed on one or more of the plurality of parameters stored external to the hierarchical configuration data model when updating the hierarchical configuration data model to include the one or more of the plurality of parameters.

6. A method for migrating configuration data for a network device, the method comprising:
storing, on one or more computer-readable media of the network device, a plurality of legacy data repositories comprising the configuration data for the network device in key-value pairs that specify a plurality of parameters and corresponding values for operation of the network device;
storing a plurality of hierarchical configuration data models for the network device, wherein each of the plurality of hierarchical configuration data models includes a plurality of nodes arranged in a hierarchical organization having a root node and a plurality of leaf nodes, wherein each of the plurality of nodes is configured to store a set of configuration data parameters for the network device, and wherein one or more of the plurality of nodes includes a plurality of external references to respective parameters of the plurality of parameters;

storing, with at least one node of the plurality of nodes that includes one of the plurality of external references, metadata specifying at least one data transformation operation to be performed on one or more of the plurality of parameters stored external to the plurality of hierarchical configuration data models when updating the plurality of hierarchical configuration data models;

generating, from the plurality of hierarchical configuration data models, a schema file that aggregates the plurality of nodes of the plurality of hierarchical configuration data models into the hierarchical organization and includes, within the plurality of nodes, the plurality of external references to the plurality of parameters;

generating a first data migration map that specifies each of the key-value pairs of the plurality of parameters and the corresponding values for operation of the network device;

generating a second data migration map from the schema file, wherein the second data migration map specifies (i) the plurality of external references within the plurality of hierarchical configuration data models to the respective parameters of the plurality of parameters, and (ii) for each external reference of the plurality of external references, a path to a corresponding node of the plurality of nodes within the plurality of hierarchical configuration data models that contained the plurality of external references; and traversing the first data migration map and, for each of the key-value pairs of the plurality of parameters and the corresponding values of the first data migration map, (i) performing any data transformation operation specified by the metadata for the parameter of the key-value pair, and (ii) writing the parameter of the key-value pair to the plurality of hierarchical configuration data models according to the path specified by the second data migration map for the parameter of the key-value pair.

7. The method of claim 6,
wherein the schema file comprises a JavaScript Object Notation (JSON) schema file containing a plurality of objects representing the plurality of nodes from the plurality of hierarchical configuration data models, and
wherein the plurality of hierarchical configuration data models comprises Yet Another Next Generation (YANG) configuration data models.

8. A network device comprising:
one or more computer-readable media storing data comprising:
  a plurality of legacy data repositories comprising configuration data for the network device in key-value pairs that specify a plurality of parameters and corresponding values for operation of the network device;
  a hierarchical configuration data model having a plurality of nodes arranged in a hierarchical organization having a root node and a plurality of leaf nodes, wherein each of the plurality of nodes of the hierarchical configuration data model is configured to store a set of configuration data parameters for the network device, and wherein one or more of the plurality of nodes includes a plurality of external references to respective parameters of the plurality of parameters; and processing circuitry configured to perform a migration of the configuration data for the network device by:
  generating a first data migration map that specifies each of the key-value pairs of the plurality of parameters and the corresponding values for operation of the network device;
  generating a second data migration map, wherein the second data migration map specifies (i) the plurality of external references within the hierarchical configuration data model to the respective parameters of the plurality of parameters, and (ii) for each external reference of the plurality of external references, a path to a corresponding node of the plurality of nodes of the hierarchical configuration data model; and
  for each external reference of the plurality of external references defined within the plurality of nodes of the hierarchical configuration data model, applying the first data migration map and the second data migration map to retrieve, with a software upgrade service executed by the processing circuitry, the parameter referenced by the external reference and stored within the plurality of legacy data repositories, and updating a respective node of the plurality of nodes within the hierarchical configuration data model to store the parameter referenced by the external reference.

9. The network device of claim 8,
wherein the hierarchical configuration data model comprises one of a plurality of hierarchical configuration data models, and
wherein to perform the migration of the configuration data for the network device comprises:
  generate, from the plurality of hierarchical configuration data models, a schema file that aggregates the plurality of nodes of the plurality of hierarchical configuration data models into the hierarchical organization and includes, within the plurality of nodes, the plurality of external references to the plurality of parameters;
  process, with the software upgrade service, the schema file to identify each of the plurality of external references.

10. The network device of claim 9,
wherein the schema file comprises a JavaScript Object Notation (JSON) schema file containing a plurality of objects representing the plurality of nodes from the plurality of hierarchical configuration data models, and
wherein the plurality of hierarchical configuration data models comprises Yet Another Next Generation (YANG) configuration data models.

11. The network device of claim 8, wherein the hierarchical configuration data model comprises a Yet Another Next Generation (YANG) configuration data model.

12. The network device of claim 8, wherein the hierarchical configuration data model includes metadata specifying at least one data transformation operation to be performed on one or more of the plurality of parameters stored external to the hierarchical configuration data model when updating the hierarchical configuration data model to include the one or more of the plurality of parameters.

* * * * *